UNITED STATES PATENT OFFICE.

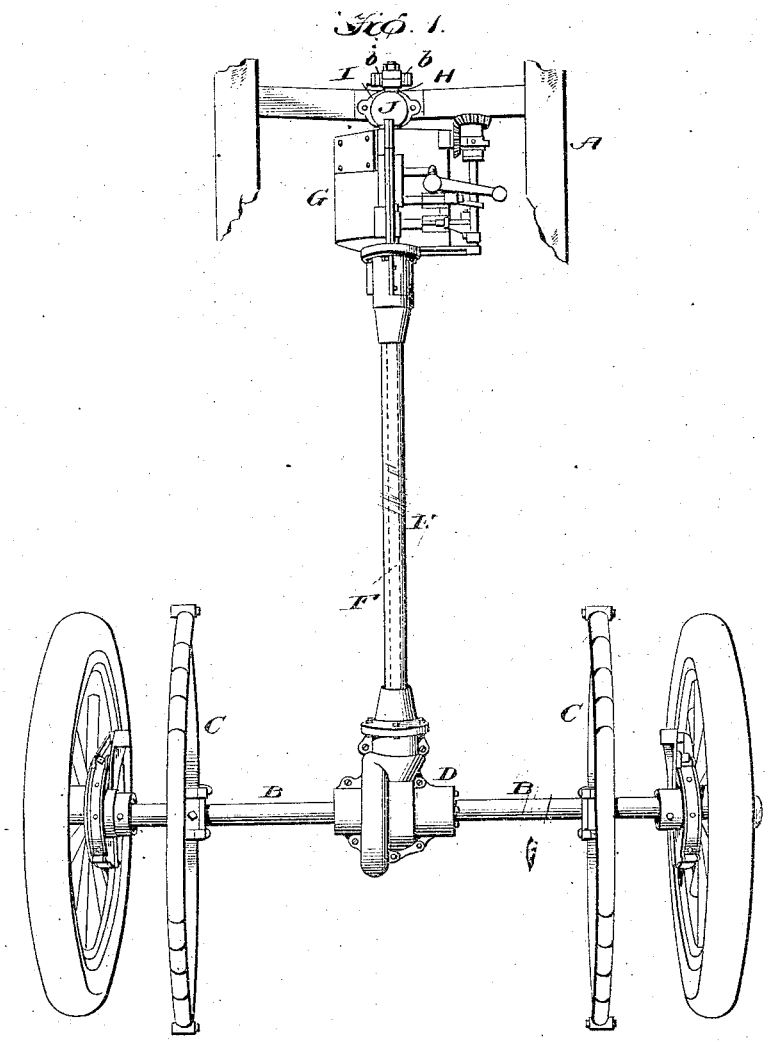

TERRY STAFFORD, OF TOPEKA, KANSAS, ASSIGNOR OF ONE-HALF TO L. ANTON SMITH AND CLEMENT SMITH, OF TOPEKA, KANSAS.

MOTOR-VEHICLE.

No. 806,933.   Specification of Letters Patent.   Patented Dec. 12, 1905.

Application filed April 5, 1905. Serial No. 254,014.

*To all whom it may concern:*

Be it known that I, TERRY STAFFORD a citizen of the United States, residing at Topeka, in the county of Shawnee and State of Kansas, have invented new and useful Improvements in Motor-Vehicles, of which the following is a specification.

My invention pertains to motor-vehicles; and it contemplates constructing and arranging the means for transmitting motion from an explosive or other motor to the rear axle in such manner that it lessens the friction and strain upon the universal joints commonly used, prevents binding of moving parts with a view of obtaining greater efficiency from the motor, and does away with the necessity of all rods or other supports to prevent the tendency of the power-applying pinion to cause the outer axle-casing to turn in the opposite direction from that in which the axle revolves.

Other advantageous features of the invention will be fully understood from the following description and claims, when taken in connection with the accompanying drawings, forming part of this specification, in which—

Figure 1 is a broken plan view of so much of a motor-vehicle as is necessary to illustrate the preferred embodiment of my invention. Fig. 2 is an enlarged detail section illustrative of the relative arrangement of the ball and socket of my improvements and the shaft journaled in the ball, and Fig. 3 is a detail section taken at right angles to Fig. 2 and in the plane indicated by the line 3 3 of said figure.

Similar letters designate corresponding parts in all of the views of the drawings, referring to which—

A is a portion of the main frame of a motor-vehicle.

B B are the sections of the rear axle.

C C are springs arranged on and connected to the said sections and designed to be connected with the rear portion of the main frame in the conventional or any other approved manner.

D is a casing connected to the axle-sections B and designed to contain the gearing (not shown) for transmitting motion to the said sections.

E is a tube designed to contain a shaft F (see dotted lines in Fig. 1) for transmitting motion to the said gearing.

G is a case designed to contain a suitable transmission-gear connected with the shaft F, and H is a shaft designed to be connected with the said transmission-gear and extending forwardly from the case G.

As shown in Fig. 1, the tube E is interposed between and rigidly connected to the casings D and G.

I is a socket connected and fixed with respect to the forward portion of the main frame A, and J is a ball fixed with respect to and forming a continuation of the case G and arranged and movable in the said socket and having a diametrical bore K, Fig. 2. The shaft H extends through and is journaled in the said bore K of the ball J or in a bushing K' in the bore and is equipped in front of the ball with two universal joints $b$ or other suitable means for connecting it with an explosive-engine or other motor, which I have deemed it unnecessary to illustrate.

The connections between the tube E and the casings D and G are rigid connections, and from this it follows that the transmission-gear in the casing G is adapted to serve to hold the gears to their work by preventing torsion of the axle, also that the transmission-gear is made a part of the axle, which obviates the necessity of transmitting the multiplied strain of the hill-climbing gear through knuckle-joints to the axle, because the knuckle-joints being between the engine and the transmission-gear they never have more power to transmit than the direct power of the motor. It will also be observed that all of the machinery is inclosed in a dust-tight casing; that the rear axle is held in place and against twisting or torsion when power is applied; that the disposition of the ball J in the socket I allows free motion to the rear axle for all kinds of spring action, while retaining the said axle in its place and transmitting the push of driving to the front portion of the main frame A, and that the construction as a whole is compact and durable and at the same time neat in appearance.

I have entered into a detailed description of the construction and relative arrangement of the parts included in the present embodiment of my invention in order to impart a definite understanding of the said embodiment. I do not desire, however, to be understood as confining myself to the said specific construction and relative arrangement of parts, as such changes or modifications may be made in practice as fairly fall within the scope of my invention as claimed.

Having described my invention, what I claim, and desire to secure by Letters Patent, is—

1. In a motor-vehicle, the combination of a frame, a rear axle connected with the frame, a gear-case connected with the rear axle, a socket carried by the forward portion of the frame, a ball complementary to said socket arranged and movable therein and having a bore, a transmission-gear case fixed with respect to the ball, a shaft connecting the gearing in the two cases, a tube interposed between and connected to the two cases and inclosing the said shaft, and a shaft connected with the gear in the second-mentioned case and journaled in the bore of the ball and provided in front of said ball with means, whereby the shaft may be connected with a motor.

2. In a motor-vehicle, the combination of a frame, a rear axle connected with the frame, a gear-case connected with the rear axle, a transmission-gear case, a shaft for connecting the gearing in the two cases, a tube interposed between and connected to the two cases and inclosing the said shaft, and a shaft connected with the gear in the second-mentioned case and journaled in and movable with respect to the forward portion of the main frame and provided with means for connecting it with a motor.

3. In a motor-vehicle, the combination of a frame, a transmission-gear case, a socket carried by the forward portion of the frame, a ball fixed with respect to said gear-case and arranged and movable in the latter, and having a bore, and a shaft connected with the gear in the case and journaled in the bore of the ball and provided, in front of the ball, with means for connecting it with a motor.

4. In a motor-vehicle, the combination of a rear axle, a casing containing the same, a tube connected to and extending forwardly from said casing, and a transmission-gear case connected to the forward portion of the tube.

5. In a motor-vehicle, the combination of a frame, a socket carried thereby, a ball complementary to said socket, a gear-case fixed with respect to the ball, and a power-transmitting shaft journaled in the ball and the gear-case.

6. In a motor-vehicle, the combination of a rear axle, a casing containing the same, a tube connected to and extending forwardly from said casing, a transmission-gear case connected to the forward portion of the tube, transmission-gearing arranged in said case and connected with the rear axle, and a universal-joint connection for connecting the transmission-gearing with a motor.

In testimony whereof I have hereunto set my hand in presence of two subscribing witnesses.

TERRY STAFFORD.

Witnesses:
 L. H. GREENWOOD,
 A. W. GREENWOOD.